United States Patent [19]

Manzoni

[11] Patent Number: 4,470,323

[45] Date of Patent: Sep. 11, 1984

[54] VEHICLE REARVIEW MIRROR REMOTE-CONTROL DEVICE

[76] Inventor: Stéphane Manzoni, 1, rue Pasteur, Saint Claude, France, 39200

[21] Appl. No.: 366,015

[22] Filed: Apr. 6, 1982

[30] Foreign Application Priority Data

Apr. 10, 1981 [FR] France ................. 81 07272

[51] Int. Cl.³ .............................................. F16C 1/10
[52] U.S. Cl. ............................................... 74/501 M
[58] Field of Search ....................... 74/501 R, 501 M; 350/320

[56] References Cited

U.S. PATENT DOCUMENTS

| | | | |
|---|---|---|---|
| 3,119,591 | 1/1964 | Malecki | 74/501 M |
| 3,476,464 | 11/1969 | Clark | 74/501 M X |
| 3,550,470 | 12/1970 | Brighton et al. | 74/501 M |
| 3,811,755 | 5/1974 | Carson | 74/501 M X |
| 4,157,862 | 6/1979 | Jackson | 74/501 M X |

Primary Examiner—Leslie A. Braun
Assistant Examiner—Frank M. McKenzie, Jr.
Attorney, Agent, or Firm—Remy J. VanOphem

[57] ABSTRACT

A vehicle rearview mirror remote control device, mounted on a casing to which a mirror is mounted and which contains a control mechanism is disclosed. A support member is constructed of a bar or U-shaped tube fixed at its two ends on the vehicle body and of which the central part extends inside the casing through two openings provided therein. The central part of the U-shaped tube includes a predetermined axis on which a cross-piece carrying the casing is pivotally mounted by means of half-clips. The cross-piece includes a second predetermined axis along which the casing is pivotally mounted. The central mechanism pivots the cross-piece about the first predetermined axis and further pivots the casing about the second predetermined axis.

6 Claims, 10 Drawing Figures

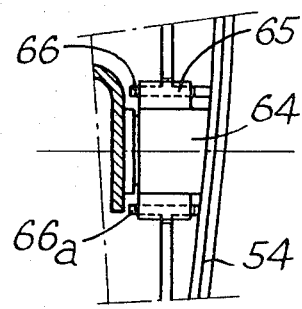
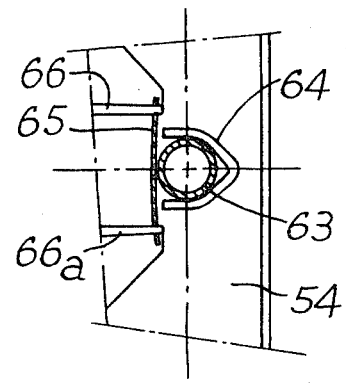
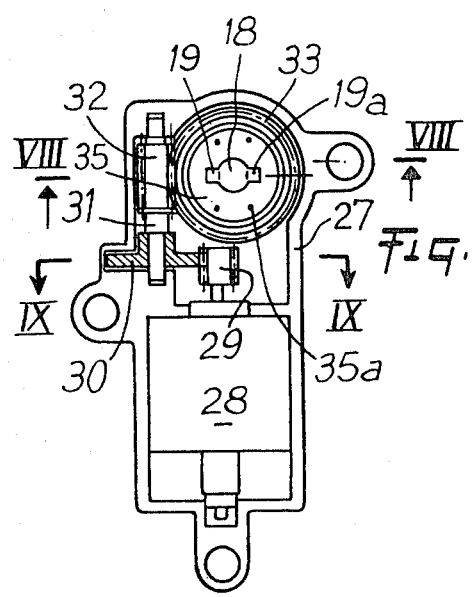
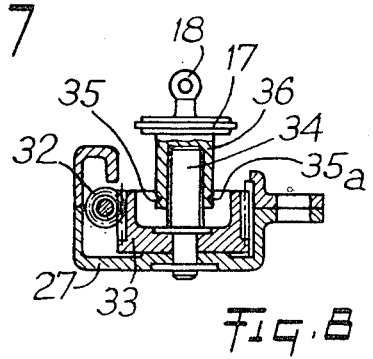
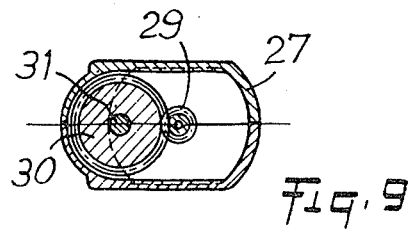

VEHICLE REARVIEW MIRROR REMOTE-CONTROL DEVICE

BACKGROUND OF THE INVENTION

The present invention relates to a device for remotely controlling a vehicle rearview mirror.

It is known to use rearview mirrors in which the remotely controlled mirror is movably mounted in its casing, together with the pivoting and control means, by an electric motor or hand-operated control.

These rearview mirrors, however, have not been entirely satisfactory in providing internal protection against dust or inclement weather conditions.

SUMMARY OF THE INVENTION

According to the present invention a device which includes a support member, integral with the body of a vehicle and which extends inside the casing through an opening is provided. The support member has a first axis around which is pivotally mounted a cross-piece. The casing carrying the mirror is pivotally mounted on the cross-piece along a second axis perpendicular to the first. First movement-controlling means are provided between the support member and the cross-piece and second movement-controlling means are provided, in an offset manner with respect to the second axis, between the cross-piece and the casing.

According to the present invention, the mirror is sealingly rigidly secured to the casing, such that a seal is obtained against dust and/or inclement weather. A gusset of very simple design closes off the opening provided in the casing to allow the angular spring movement of the casing.

According to the present invention, the support member is constructed of a U-shaped bar or tube which is secured at both ends to the body of the vehicle. The central part of the U-shaped bar extends inside the casing through two openings provided in the latter. The central part of the tube represents vertical axis on which the cross-piece carrying the casing is pivotally mounted by means of two half-clips. The half-clips each present an opening in which is engaged the end of a pin integral with the central part of the U-shaped bar or tube. The cross-piece includes two pivots disposed according to the horizontal axis, which are engaged in bearings provided on the casing.

The pivoting points of the mechanism orthogonal pivoting means are very far apart, and a resilient strip is provided to take up the play, along the axis of the pivot bearing making this arrangement especially suited for rearview mirrors mounted on trucks and coaches which require very large mirrors.

Another object of the present invention is to provide a mechanism which is fitted inside the casing such that the casing can be of a relatively slim design.

A further object of the present invention is to provide a rearview mirror which can be mounted on the vehicle door or on the gusset of the vehicle door.

The present invention will be more readily understood by those skilled in the art when the following description is read in conjunction with the accompanying drawings:

BRIEF DESCRIPTION OF DRAWINGS

FIGS. 6 and 6a are cross-sectional views showing the details of an embodiment of the bearings;

FIG. 7 is a longitudinal sectional view of an embodiment of the movement-controlling means;

FIG. 8 is a cross-sectional view taken along line VIII—VIII of FIG. 7; and

FIG. 9 is a cross-sectional view taken along line IX—IX of FIG. 7.

DETAILED DESCRIPTION OF THE PREFERRED EMBODIMENT

Figure 1:
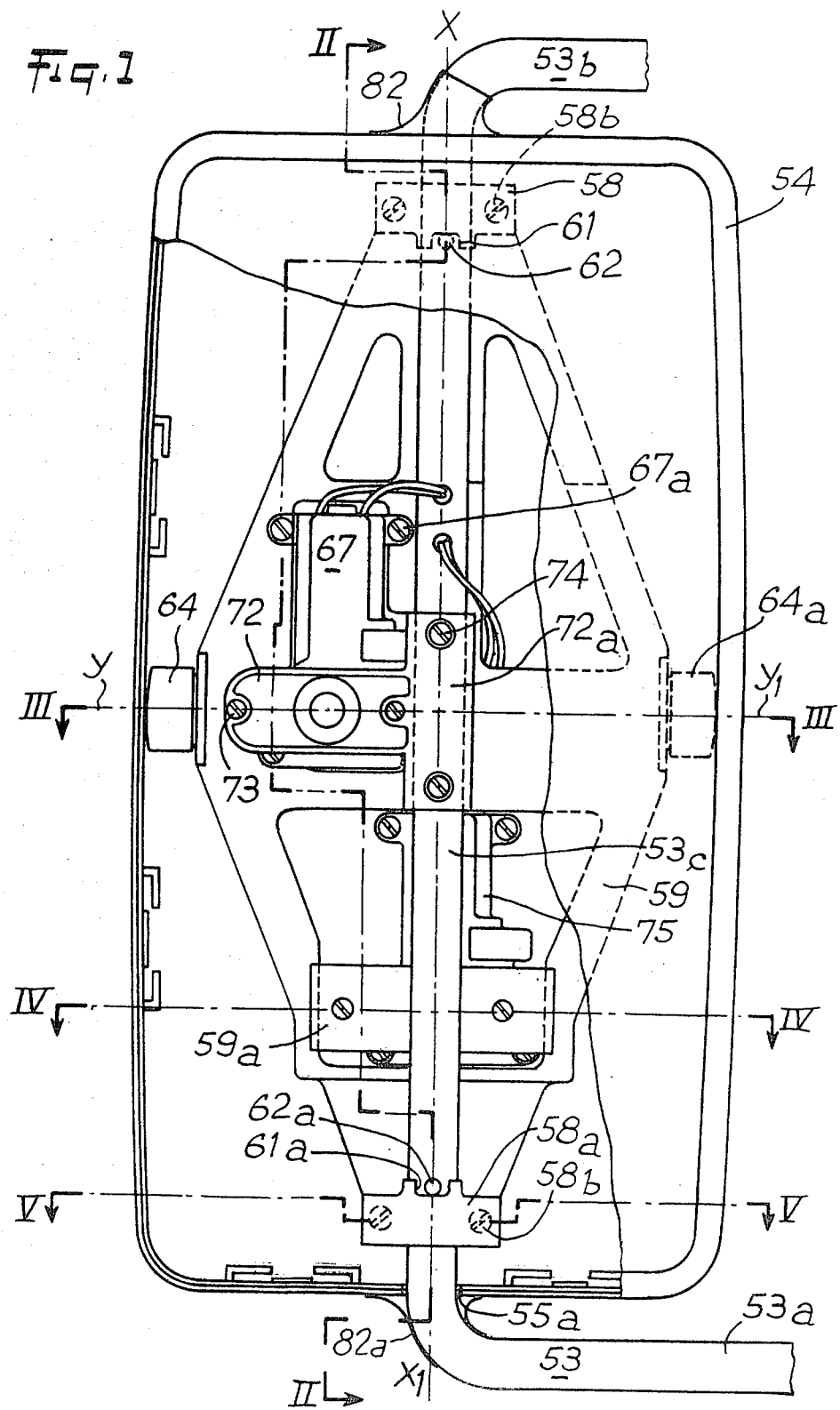
FIG. 1 is an elevational view of an embodiment of the rearview mirror according to the invention, particularly designed for trucks and coaches.
Figure 2:
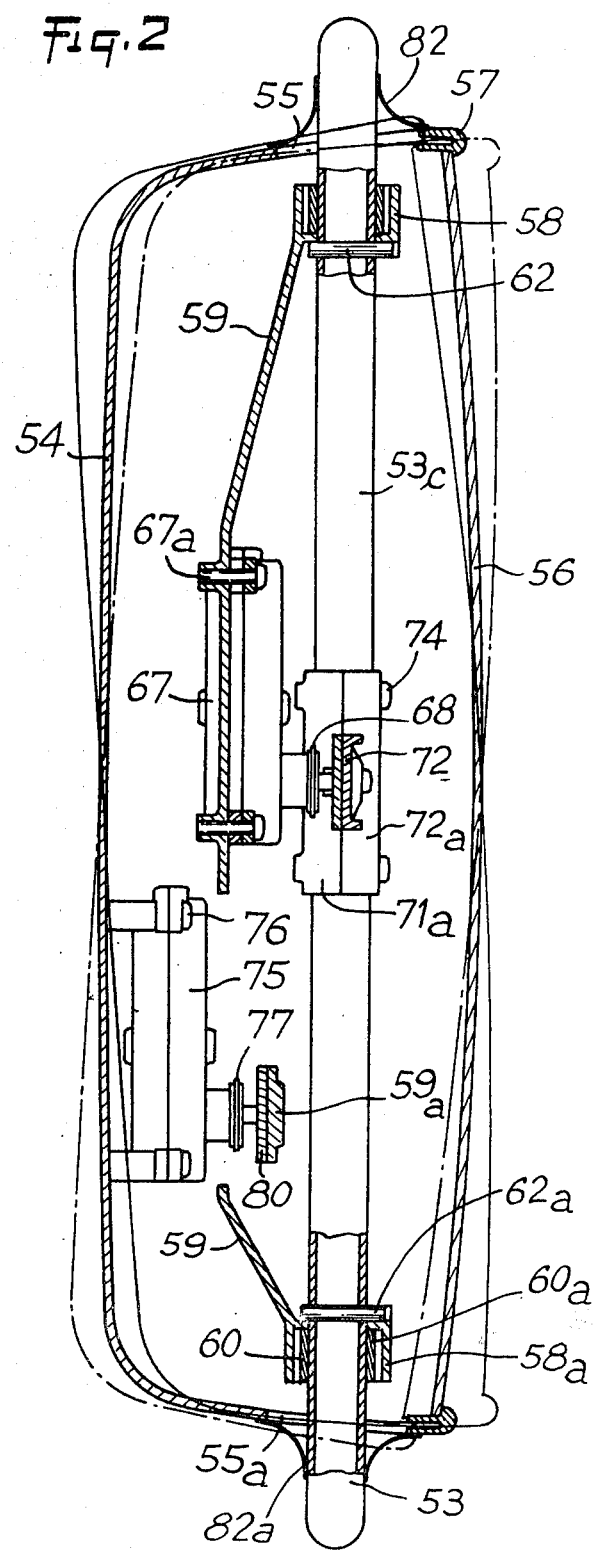
FIG. 2 is a partial break away sectional view taken along line II—II of FIG. 1.

FIGS. 1 to 5 illustrate an embodiment of the rearview mirror according to the invention, which is particularly intended for trucks and coaches.

This rearview mirror includes a support member which consists a U-shaped tube 53 secured at its two ends 53a and 53b on the vehicle body (not shown), and of which the central part 53c extends inside a casing 54 through two openings 55 and 55a provided therein. Elastomer gussets 82 and 82a are mounted surrounding the U-shaped tube 53, to tightly seal off the openings 55 and 55a of the casing 54. The casing 54 is provided on its front face with a mirror 56 which is secured on the casing by means of a mirror-holding ring 57.

A cross-piece member 59 is mounted for pivoting about a vertical axis $X—X_1$, by means of half-clips 58 and 58a and screws 58b, on the central parts 53c of the support tube which extends inside the casing.

The half-clips 58 and 58a and the cross piece 59 form annular portions around the central part 53c of the tube in which annular portions are inserted friction members 60 and 60a permitting adjustment of the tightness by which the cross-piece 59 and half-clips 58 and 58a hold the tube 53. The half-clips 58 and 58a are each provided with an opening 61 and 61a in which is engaged a pin 62 and 62a fastened to the central part 53c of the tube. The pins 62 and 62a are used to limit the axial and rotary movements of the cross-piece 59.

Figure 3:
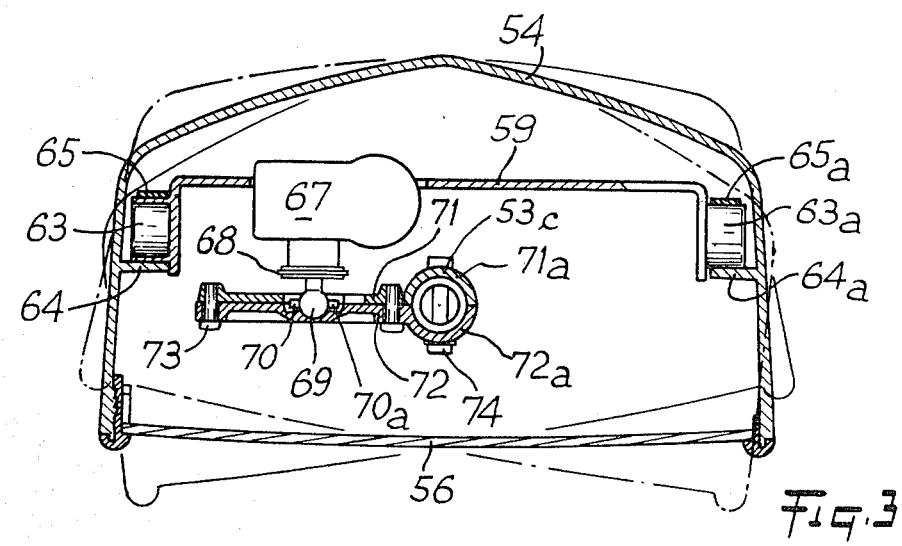
FIG. 3 is a partial cross-sectional view taken along line III—III of FIG. 1.
Figure 4:
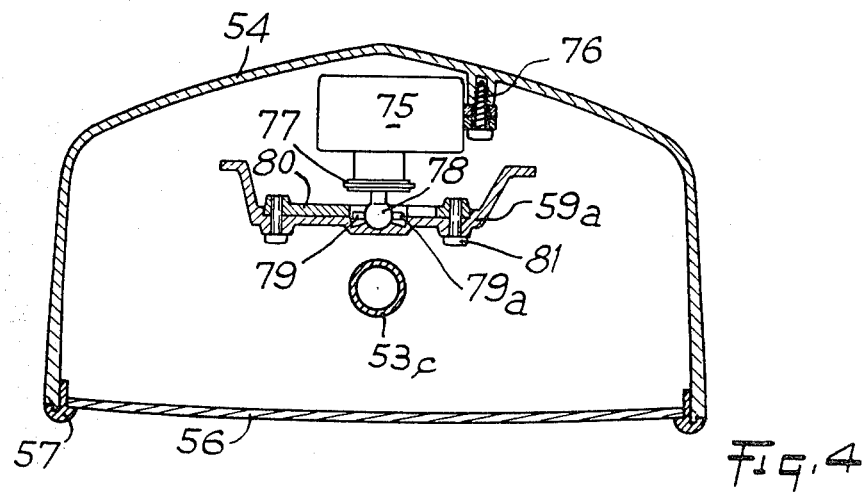
FIG. 4 is a cross-sectonal view taken along line IV—IV of FIG. 1.
Figure 5:
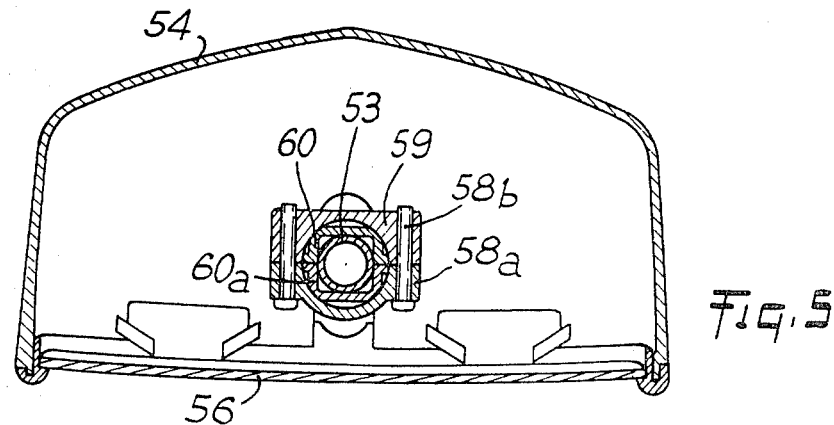
FIG. 5 is a cross-sectional view taken along line V—V of FIG. 1.

The cross-piece 59 includes two pivots 63 and 63a, clearly shown in FIG. 3 which are pivotally mounted in recesses 64 and 64a of the casing. The recesses are open on one side as illustrated in FIG. 6a. The pivots are held in position in the recesses by a resilient strip of steel 65 for example, resting against the support members 66 and 66a, integral with the casing 54.

Thus, the casing 54 is mounted for pivoting about a horizontal axis $Y—Y_1$ relative to on the cross-piece 59.

Control mean 67, for controlling the movement of the cross-piece 59 with respect to the support tube 53, are mounted by way of screws 67a on the cross-piece 59. The control means are identical to those illustrated in FIGS. 7, 8, 9.

The control means 67 include a movable head 68, which is axially slidable, and present and integral ball joint 69 provided with two lugs 70 and 70a. The said ball joint is disposed inside a recess provided between two arms 71, 72 joined together by screws 73 and having two half-clips 71 and 72a by which they are mounted on the central part 53c of the tube by the screws 74.

The ball joint 69 is positioned along an axis $Y—Y_1$ in order to pivot the cross-piece about the axis $X—X_1$ with respect to the U-shaped tube 53.

In a similar manner, control means 75 for controlling the movement of the casing 54 with respect to the cross-piece 59, are secured on the bottom of the casing 54 by means of screws 76. The control means 75 shown in FIGS. 2 and 4 include a movable head 77 which is axially slidable and an integral ball joint 78 with two lugs 79 and 79a. The ball joint 78 is engaged in a recess provided between a wall 59a of the cross-piece and a plate 80 secured on the wall by screws 81, the point of support of the ball joint 78 being shifted away from the axis $Y—Y_1$ and located on the axis $X—X_1$.

The device illustrated in FIGS. 1 to 5 works as follows:

When actuating the control means 67, the head 68 moves axially and causes the rotation of the cross-piece 59 due to the fact that the ball joint 69 is in intimate contact against the central part 55c of the support tube. As a result, the cross-piece 59, casing 54 and the mirror 56, which are all fastened together, pivot about the axis $X—X_1$, i.e. left to right.

When actuating the control means 75, the head 77 moves axially and causes the rotation of the casing 54 due to the fact that the ball joint 78 is attached to the cross-piece 59. As a result, the casing 54 and the mirror 56 pivot about the axis $Y—Y_1$, i.e. upwardly and downwardly.

FIGS. 7, 8 and 9 illustrate an embodiment of both control means 67 and 75, each of which includes a case 27 containing an electric motor 28. The output shaft of the motor carries a pinion 29 which meshes with a pinion 30 wedged on a spindle 31 mounted for rotation inside the case. The spindle 31 is shaped as an endless screw or ball screw 32 and is mounted to be in mesh with a tangential wheel 33 to which is mounted for rotation a helical-threaded rod 34. Two elastic stirrup pieces 35 and 35a integral with a sleeve 36 are mounted around the rod 34. the head 17 of the sleeve 36 carries a ball joint 18 provided with lugs 19 and 19a.

The device works as follows:

By powering the motor 28, the endless screw 32 and the tangential wheel 33 are driven in rotation via the pinions 29 and 30. The helical threaded the rod 34, by its cooperation with stirrup piece 35 and 35a, provides a driving translation for the sleeve.

Although the control means described and illustrated herein use electric motor, it is obvious that the rearview mirror can be moved by any other mechanical means such as, for example, a cable actuated from inside the vehicle by a hand-operated control.

The invention is in no way limited to the description given hereinabove and, on the contrary, covers any modifications that can be brought thereto without departing from the scope thereof.

What is claimed is:

1. A rearview remote control mirror device for attachment to a vehicle body, said mirror device being mounted in a casing containing a control mechanism and having a mirror attached thereto, said remote control mirror device comprising:

a U-shaped support member having one end attached to said vehicle body; and opposite end attached to said vehicle body; and a central part extending into said casing, said U-shaped support member further having a first predetermined axis substantially coaxial with said central part of said U-shaped support member;

a cross-piece pivotally mounted within said casing and cooperating with said central part of said U-shaped support member, said cross-piece having a second predetermined axis substantially perpendicular to said first predetermined axis of said U-shaped support member, said casing having said mirror attached thereto being mounted to said cross-piece along said second predetermined axis;

first means for controlling movement of said mirror, said first means for controlling movement disposed along said second predetermined axis of said cross-piece and further interposed said U-shaped support member and said cross-piece;

second means for controlling movement of said mirror, said second means for controlling movement being offset a predetermined distance from said second predetermined axis of said cross-piece;

said casing further having at least two openings through which extend said one end and said opposite end, respectively, of said U-shaped support member, said casing further having means for bearing integral with said casing;

at least one half-clip mounted to said cross-piece and having an opening at one end;

a pin member mounted to said central part of said U-shaped support member and said opening of said at least one half-clip such that said pin and said opening cooperate to pivot said cross-piece about said first predetermined axis when said first means for movement of said mirror is activated; and said cross-piece further comprising at least one pivot disposed along said second predetermined axis and engaging said means for bearing of said casing such that said cross-piece cooperates through said at least one pivot and means for bearing with said second means for controlling movement of said mirror to pivot said casing about said second predetermined axis when said second means for controlling movement of said mirror is activated.

2. The remote control mirror device as claimed in claim 1 wherein said means for bearing further comprises:

at least one cup-shaped recess integrally formed with said casing for receiving said at least one pivot of said cross-piece;

a resilient strip mounted to said casing adapted to bias said at least one pivot into said at least one cup-shaped recess such that said cross-piece communicates with said at least one cup-shaped recess to pivot within said cup-shaped recess.

3. The remote control mirror device as claimed in claim 1 wherein said first means for controlling movement of said mirror further comprises:

a ball joint mounted to said at least one half-clip; and means for exerting a force on said ball joint, said means for exerting a force interposed said ball joint and said cross-piece such that said means for exerting a force on said ball joint rotates said casing about said first predetermined axis.

4. The remote control mirror device as claimed in claim 1 wherein said second means for controlling movement of said mirror further comprises:
- a ball joint mounted to said cross-piece a predetermined distance from said second predetermined axis; and
- means for exerting a force on said ball joint, said means for exerting a force interposed said ball joint and said cross-piece such that said means for exerting a force on said ball joint rotates said casing about said second predetermined axis.

5. The remote control mirror device as claimed in claim 3 wherein said means for exerting a force further comprises:
- a sleeve member attached to said ball joint, said sleeve member having an integral helical thread;
- a threaded helical rod member mounted to said internal helical thread of said sleeve member;
- a tangential wheel member mounted to said threaded helical rod member for rotation therewith, said tangential wheel member having a worm thread on its outer radial periphery;
- an endless screw member spaced a predetermined distance from said tangential wheel member and cooperating therewith whereby rotation of said endless screw member causes rotary movement of said tangential wheel member and said threaded helical rod member such that said sleeve member moves axially along the complementary helical thread of said sleeve member and said threaded helical rod member with respct to said threaded helical rod member; and
- means for rotating said endless screw member.

6. The remote control mirror device as claimed in claim 4 wherein said means for exerting a force further comprises:
- a sleeve member attached to said ball joint, said sleeve member having an internal helical thread;
- a threaded helical rod member mounted to said internal helical thread of said sleeve member;
- a tangential wheel member mounted to said threaded helical rod member for rotation therewith, said tangential wheel member having a worm thread on its outer radial periphery;
- an endless screw member spaced a predetermined distance from said tangential wheel member and cooperating therewith whereby rotation of said endless screw member causes rotary movement of said tangential wheel member and said threaded helical rod member such that said sleeve member moves axially along the complementary helical thread of said sleeve member and said threaded helical rod member with respect to said threaded helical rod member; and
- means for rotating said endless screw member.

* * * * *

UNITED STATES PATENT AND TRADEMARK OFFICE
CERTIFICATE OF CORRECTION

PATENT NO. : 4,470,323
DATED : September 11, 1984
INVENTOR(S) : Stephane Manzoni It is certified that error appears in the above-identified patent and that said Letters Patent is hereby corrected as shown below:

Column 2, line 40, delete "parts" and insert ---- part ----.

Column 2, line 53, after "Fig. 3" insert a comma ---- , ----.

Column 2, line 67, delete "present and" and insert ---- presents an ----.

Column 2, line 68, delete "said".

Column 3, line 51, delete "the rod" and insert ---- rod ----.

Column 3, line 52, after "with" insert ---- the ----.

In the Claims

Column 4, line 38, after "for" insert ---- controlling ----.

Signed and Sealed this

Fourteenth Day of May 1985

[SEAL]

Attest:

DONALD J. QUIGG

Attesting Officer   Acting Commissioner of Patents and Trademarks